US010380387B2

(12) United States Patent
Einman et al.

(10) Patent No.: US 10,380,387 B2
(45) Date of Patent: Aug. 13, 2019

(54) INTEGRATED SMART CARD PRINTING AND ENCODING

(71) Applicant: Seagull Scientific, Inc., Bellevue, WA (US)

(72) Inventors: Ian Jeffrey Einman, Bellevue, WA (US); Han Ba Dang, Redmond, WA (US)

(73) Assignee: SEAGULL SCIENTIFIC, INC., Bellevue, WA (US)

( * ) Notice: Subject to any disclaimer, the term of this patent is extended or adjusted under 35 U.S.C. 154(b) by 471 days.

(21) Appl. No.: 13/626,821

(22) Filed: Sep. 25, 2012

(65) Prior Publication Data
US 2014/0084071 A1     Mar. 27, 2014

(51) Int. Cl.
*G06K 19/06*      (2006.01)
*G06K 1/12*       (2006.01)

(52) U.S. Cl.
CPC ............ *G06K 1/128* (2013.01); *G06K 1/121* (2013.01)

(58) Field of Classification Search
CPC .......... G06K 19/00; G06F 3/08; G06F 3/1201
USPC ........................................ 235/492, 383, 435
See application file for complete search history.

(56) References Cited

U.S. PATENT DOCUMENTS

| 5,410,642 | A  | * | 4/1995  | Hakamatsuka ....... G06F 17/243 358/1.14 |
| 5,617,528 | A  | * | 4/1997  | Stechmann et al. .......... 715/201 |
| 5,717,776 | A  | * | 2/1998  | Watanabe ............ G06Q 20/341 235/380 |
| 5,768,143 | A  | * | 6/1998  | Fujimoto ............. G06Q 20/341 235/375 |
| 5,771,071 | A  | * | 6/1998  | Bradley ................. B42D 25/00 348/335 |
| 7,339,690 | B2 | * | 3/2008  | Lenz et al. .................... 358/1.15 |
| 2001/0053947 | A1 | * | 12/2001 | Lenz et al. .................... 700/117 |
| 2003/0090712 | A1 | * | 5/2003  | Lenz et al. .................... 358/1.15 |

(Continued)

OTHER PUBLICATIONS

"About Plastic Card Printing," Zebra Technologies Corporation, Camarillo, Calif., www.EITronCards.com, Dec. 1999, <http://www.apcom.com.au/docs/AboutCardPrinting.pdf> [retrieved Jan. 10, 2013], 13 pages.

(Continued)

*Primary Examiner* — Daniel St Cyr
(74) *Attorney, Agent, or Firm* — Christensen O'Connor Johnson Kindness PLLC

(57) ABSTRACT

A printer driver receives printing data (e.g., data to be printed on a surface of the smart card) and encoding data from an application. The application may expose a device-independent printing interface with one or more escape functions for sending device-specific data (e.g., smart card encoding data). The printer driver generates integrated data comprising the printing data and the encoding data. A command coordinator (e.g., a language monitor) extracts printing commands and encoding commands from integrated data, sends printing commands to a printer device, and sends encoding commands to an encoder. The encoder can be recognized as a device that is separate from the printer device, even where the encoder and the printer device are housed in the same physical device. Described aspects can be used in a network environment with multiple client devices that share printing and encoding devices.

25 Claims, 9 Drawing Sheets

(56) References Cited

U.S. PATENT DOCUMENTS

2008/0156883 A1* 7/2008 Kubota .................. G06K 1/121
235/475
2010/0189489 A1* 7/2010 Aihara .................... B41J 29/17
400/582

OTHER PUBLICATIONS

"BarTender Downloads," Seagull Scientific, Inc., Jun. 1, 2012, <http://www.seagullscientific.com/aspx/free-bar-code-label-printing-software-download.aspx> [retrieved Jul. 5, 2012], 2 pages.

"BarTender® White Paper: What's New in BarTender 10.0," May 23, 2012, Seagull Scientific, Inc., www.seagullscientific.com/aspx/white-papers.aspx, 76 pages.

"ExtEscape Function,"Microsoft Corporation, Jun. 7, 2012, <http://msdn.microsoft.com/en-us/library/windows/desktop/dd162708> [retrieved Jul. 31, 2012], 3 pages.

"Free Windows Printer Driver Downloads," Seagull Scientific, Inc., Feb. 28, 2012, <http://www.seagullscientific.com/aspx/free-windows-printer-drivers-download.aspx> [retrieved Jul. 5, 2012], 4 pages.

"GDI Print API," Microsoft Corporation, Jun. 7, 2012, <http://msdn.microsoft.com/en-us/library/windows/desktop/ff686799(d=printer,v=vs.85).aspx> [retrieved Jul. 31, 2012], 2 pages.

"History of Windows Printer Driver Releases," Seagull Scientific, Inc., www.seagullscientific.com/aspx/history-of-windows-printer-drivers-for-thermal-label-printers.aspx, as early as Jan. 5, 2012, 1 page.

"Introduction to Printing," Microsoft Corporation, Jun. 11, 2012, <http://msdn.microsoft.com/en-us/library/windows/hardware/ff551767(d=printer,v=vs.85).aspx> [retrieved Jul. 5, 2012], 2 pages.

"Language and Port Monitor Interaction," Microsoft Corporation, Jun. 11, 2012, <http://msdn.microsoft.com/en-us/library/windows/hardware/ff556447(d=printer,v=vs.85).aspx> [retrieved Jul. 5, 2012], 2 pages.

"Language Monitors," Microsoft Corporation, Jun. 11, 2012, <http://msdn.microsoft.com/en-us/library/windows/hardware/ff556450(d=printer,v=vs.85).aspx> [retrieved Jul. 5, 2012], 1 page.

Mathers, B., "How to Print a Smart Card Using FIM Certificate Management and ID Works Software v6.5 or v5.1," Microsoft Corporation, Nov. 12, 2010, <http://social.technet.microsoft.com/wiki/contents/articles/how-to-print-a-smart-card-using-fim-certificate-management-and-id-works-software-v6-5-or-v5-1.aspx?Sort=MostUseful&PageIndex=1> [retrieved Jun. 27, 2012], 3 pages.

"World's Leading Label, RFID, Card Printing & Barcode Software," Seagull Scientific, Inc., n.d., <http://www.seagullscientific.com/aspx/bar-code-label-software.aspx> [retrieved Jul. 5, 2012], 1 page.

"Writing a Print Monitor," Microsoft Corporation, Jun. 11, 2012, <http://msdn.microsoft.com/en-us/library/windows/hardware/ff563806(d=printer,v=vs.85).aspx> [retrieved Jul. 5, 2012], 2 pages.

* cited by examiner

INTEGRATED SMART CARD PRINTING AND ENCODING

BACKGROUND

A device driver is computer program code that is used by a computer to control a hardware device. A printer driver is a device driver for a printer. Printers of various types typically require customized printer drivers, but the drivers are designed to be generally compatible with a variety of applications that generate print jobs or perform printing tasks. Some printer drivers include a rendering component and a configuration component. The rendering component converts graphics objects into printer commands that instruct a printer to render an image of the content to be printed on a printable medium. The configuration component communicates with applications and enables users to control printer options.

In a typical mode of operation, printer drivers generate files that are sent to a print spooler, which assembles the files for later processing, typically in a "first-in, first-out" manner. Print spoolers allow printing tasks to be queued and performed when resources become available (also known as background printing), thereby allowing an application that caused a task to be spooled to continue operating without having to wait for the task to be completed.

Some printing devices are able to perform more than one function. For example, multi-function printers with a built-in scanner can perform printing and scanning tasks. However, the printing tasks and the scanning tasks are generally kept separate and are not related to each other.

Cards (e.g., plastic ID cards) are among the many types of printable media available today. Smart cards are devices that include computer-readable data encoded in storage (e.g., on-chip storage) on the card. Aside from the storage medium and other computing-related hardware, smart cards are typically made of plastic or some other material on which information can be printed (e.g., a cardholder's name, photograph, or other identifying information). The production of smart cards typically involves two separate processes: printing and encoding. The separate nature of these processes can add time and complexity to the production of smart cards. In a typical scenario, an application tasked with printing on the surface of the smart card communicates with a printer driver, which generates a file containing the content to be printed. After the smart card is printed, another application is used to encode data in storage on the printed smart card. In a network environment where printers and other resources are shared by several computers, this process can become even more complex.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a printer driver receives a first set of data configured to cause a printer to print on a surface of a smart card along with a second set of data configured to cause the smart card to be encoded. The printer driver generates integrated data comprising the first set of data and the second set of data. A command coordinator can extract printer commands and smart card encoder commands from the integrated data. The command coordinator can coordinate commands in a network environment comprising plural client devices that share the printer.

In another aspect, a command coordinator (e.g., a language monitor) receives integrated data (e.g., from a printer driver) in a print stream. The integrated data comprises printing data and smart card encoding data. The command coordinator extracts a printing command and an encoding command from the integrated data. The command coordinator also can extract printing and smart card encoding commands associated with one or more client devices from separate units of integrated data (e.g., in separate spool files). The printer driver, the integrated data, and the command coordinator facilitate an integrated smart card printing and encoding process.

In another aspect, a printer driver receives printing data and encoding data from an application. The application may expose a device-independent printing interface with one or more escape functions for sending device-specific data (e.g., smart card encoding data). The printer driver generates integrated data comprising the printing data and one or more embedded packets (e.g., a markup language packet such as an XML packet) that include encoding data. A language monitor translates a first portion of the integrated data into a printing command and translates a second portion of the integrated data from the embedded packet into an encoding command (e.g., a smart card encoding command). The language monitor sends the printing command to a printer device and sends the encoding command to an encoder (e.g., a smart card encoder). The language monitor can take further action (or cause other components to take further action) if the printing and encoding operations succeed or fail (e.g., logging the success or failure, sending appropriate success or failure notifications). The encoder may be recognized as a device that is separate from the printer device, even where the encoder and the printer device are housed in the same physical device. For example, a smart card encoder and a printer device can be enumerated as separate USB devices. If multiple items (e.g., smart cards) are being encoded and printed, the language monitor can coordinate commands such that printing and encoding commands for each item are synchronized. For example, if a smart card has been printed and is in the process of being encoded, further commands (e.g., print commands or encoding commands for additional smart cards) can be blocked until the encoding process for the smart card is complete.

In another aspect, a printer driver receives data configured to cause a duplex printer to print on plural surfaces of a smart card and second data configured to cause the smart card to be encoded with computer-readable data. The printer driver generates integrated data comprising the first data and the second data. A command coordinator can extract a printer command for each of the plural surfaces and a smart card encoder command from the integrated data.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The present disclosure includes descriptions of various aspects of integrated smart card printing and encoding systems and processes.

Functionality for printing and encoding smart cards can be included in the same physical device, but it may still be necessary to coordinate tasks carried out by a smart card encoding module (also referred to herein as a smart card encoder) with tasks carried out by a printing module. For example, a smart card may be encoded after image data for printing on the smart card is sent, but before image data for the next card in a series of cards is sent. Further, card printers with smart card encoding capability often enumerate a smart card encoder as a USB (Universal Serial Bus) device that is separate from the USB printing device. Printing and encoding smart cards with such card printers typically involves communicating with both USB devices. However, many printer drivers are not able to communicate with more than one USB device. For example, traditional printer drivers designed for use with a Microsoft Windows operating system operate according to a model that assumes that USB printers enumerate as a single device (USBPRINT) and that all communication with the printer is handled via that single USB device. Such traditional printer drivers cannot be easily modified to include smart card encoding functionality. Instead, end users are expected to encode smart cards using a software development kit (SDK) or third-party application that communicates with the device directly and does not use the printer driver for encoding.

In various embodiments of the present disclosure, a printer driver generates integrated data that facilitates coordination of commands sent to a smart card printing module and commands sent to a smart card encoding module. For example, a printer driver designed for use with a Microsoft Windows operating system generates integrated data that facilitates coordination of commands sent to a composite USB device that enumerates a smart card encoding module and a smart card printing module as separate USB devices.

Figure 1:
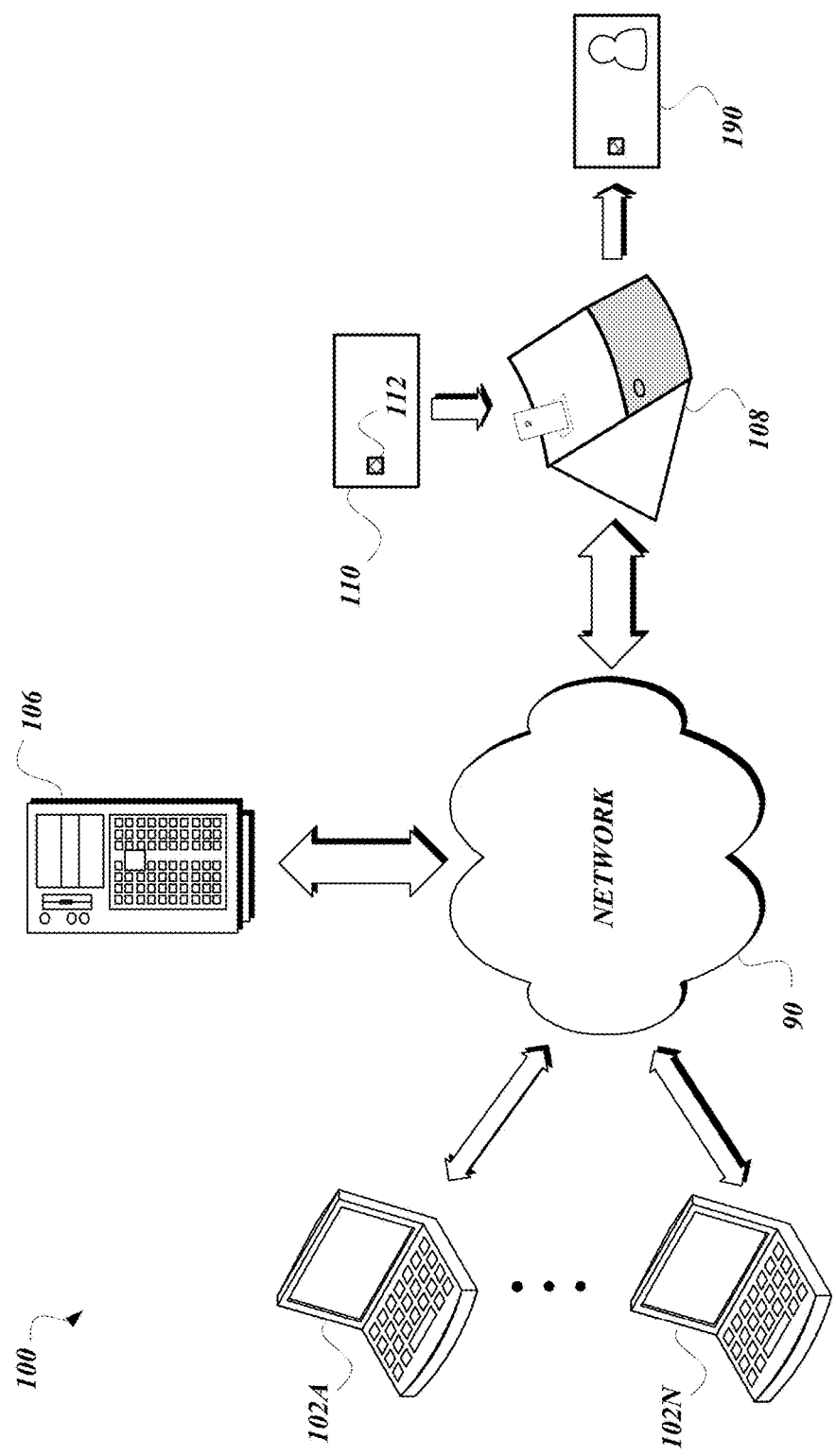
FIG. 1 is a block diagram that illustrates a generalized integrated smart card printing and encoding system according to various aspects of the present disclosure.

FIG. 1 is a block diagram that illustrates a generalized integrated smart card printing and encoding system 100 according to various aspects of the present disclosure. The system 100 includes client devices 102A-N, a server 106, and a smart card printing device 108. The components of the system 100 may communicate with each other via a network 90. The network 90 may comprise one or more sub-networks (not shown). For example, the network 90 may comprise a local area network (e.g., a Wi-Fi network) that provides access to a wide-area network such as the Internet. The client devices 102A-N may be computing devices operated by end users to use an integrated smart card printing and encoding process, although various operations described herein can be performed without direct control by an end user.

The server 106 may act as a print server that queues print jobs for later processing at the smart card printing device 108. A print server that implements one or more of the tools described herein (e.g., an appropriately configured command coordinator, as described in detail below) can coordinate printing and encoding tasks sent by one or more of the client devices 102A-N. The server 106 and/or other servers (not shown) may perform other functions. For example, one or more of the client devices 102A-N may connect to a server to access stored information such as digital photographs, personal identification information, or other information that may be useful for printing and encoding a smart card 110. Although the client devices 102A-N, the server 106, and the smart card printing device 108 are shown as communicating with each other via the network 90, other arrangements are possible. For example, if the server 106 is operating as a print server, it may be connected directly to the smart card printing device 108.

The smart card printing device 108 uses information obtained from the client devices 102A-N, the server 106, both the client devices 102A-N and the server 106, or from some other source to print information on a smart card 110. The system 100 also encodes the smart card 110, storing information in smart card storage 112. The smart card printing device 108 may include a card encoder (not shown), or card encoding may be performed by some other component of system 100. After an integrated smart card printing and encoding process has been performed on the smart card 110, the printed and encoded smart card 190 is available for use.

Figure 2A:
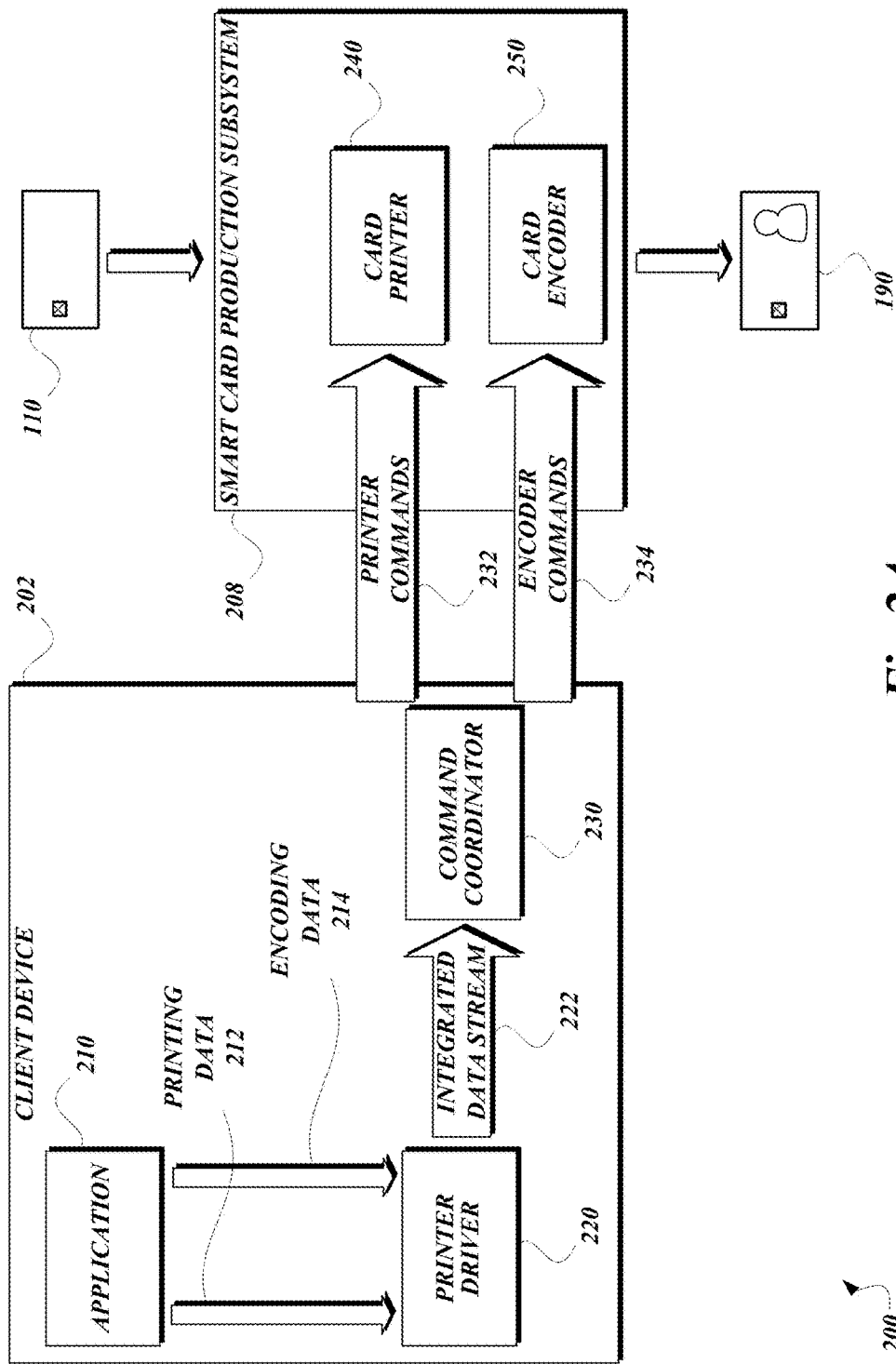
FIGS. 2A and 2B are block diagrams that illustrate a detailed example of an integrated smart card printing and encoding system according to various aspects of the present disclosure.
Figure 2B:
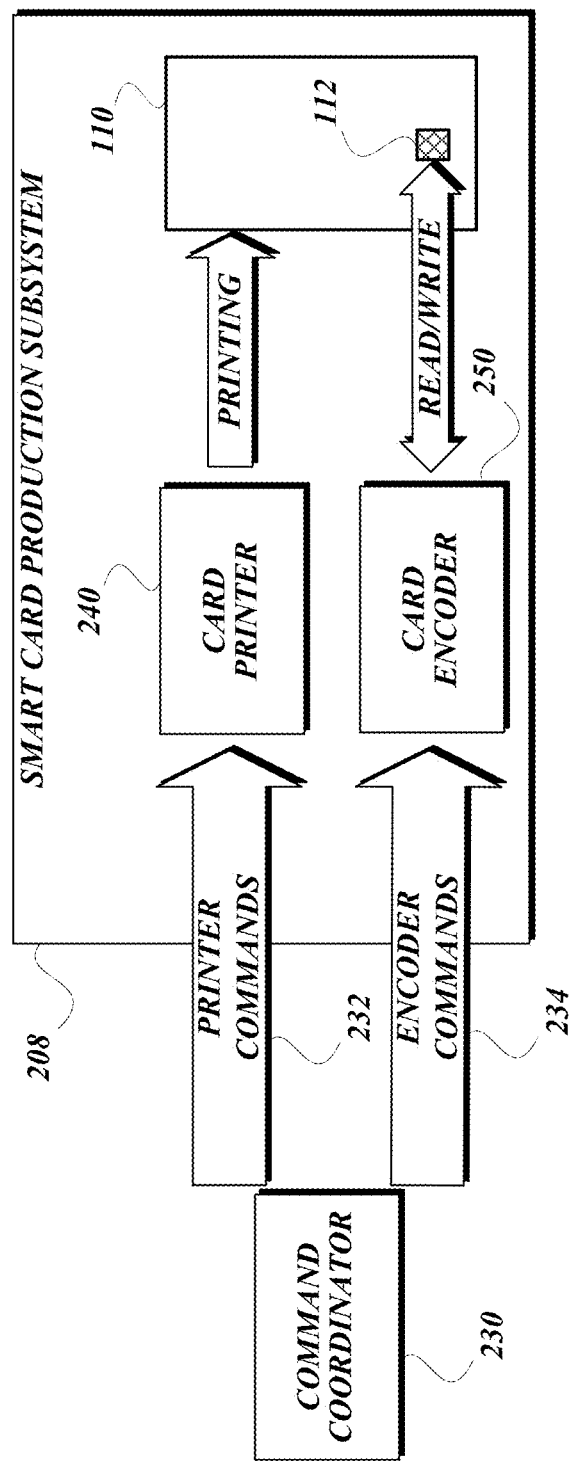

FIGS. 2A and 2B are block diagrams that illustrate another integrated smart card printing and encoding system 200 according to various aspects of the present disclosure. The system 200 includes a client device 202 and a smart card production subsystem 208 (e.g., a card printer with smart card encoding functionality). Although some components shown in FIG. 1 (e.g., network 90, server 106, additional client devices) are not shown in FIGS. 2A and 2B for ease of illustration, such components (or other components) can be included in alternative arrangements of the system 200.

Figure 4:
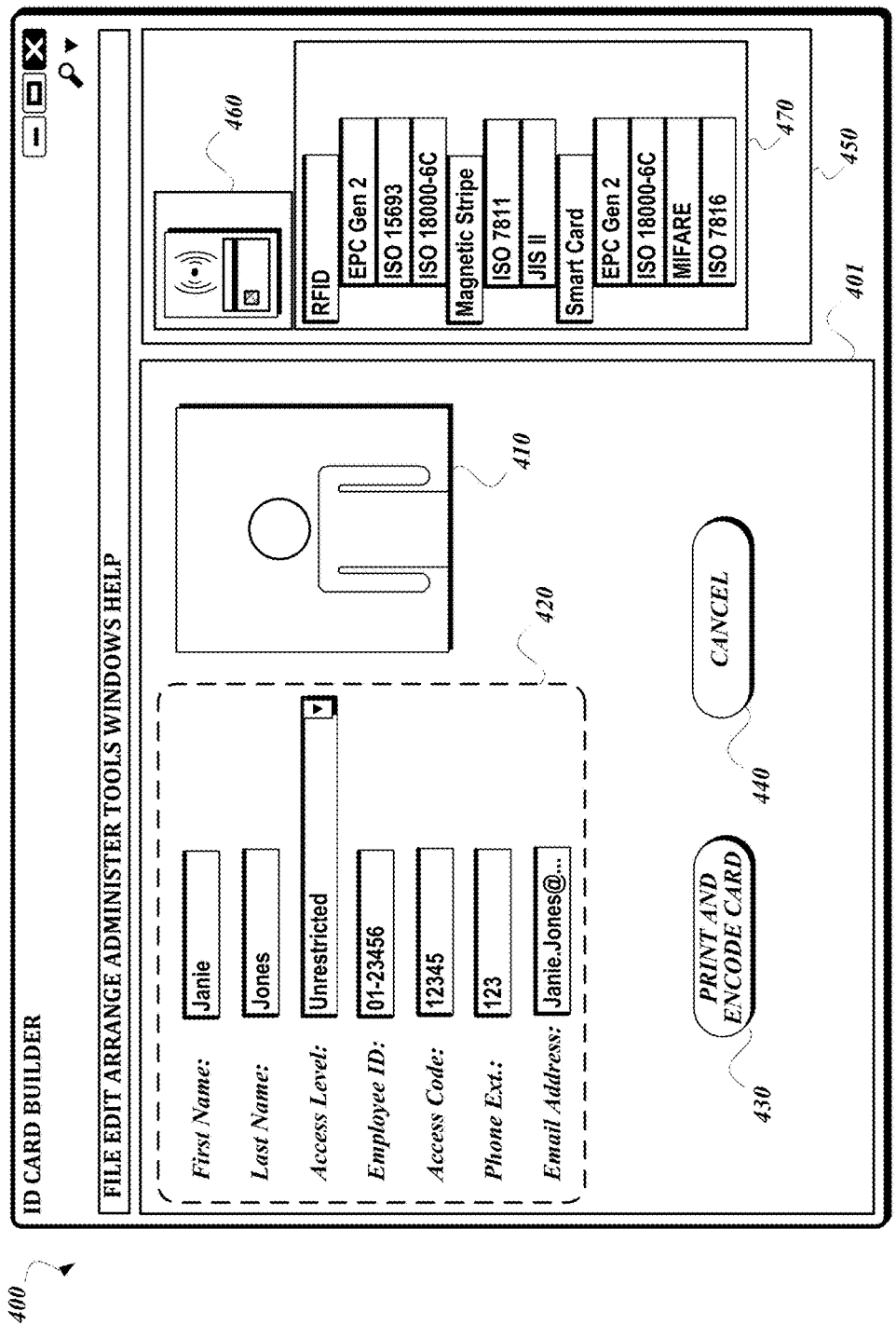
FIG. 4 is a diagram that illustrates an example user interface according to various aspects of the present disclosure.

In the example shown in FIG. 2A, the client device 202 runs an application 210 that can be used to provide data (e.g., printing data 212 and encoding data 214) for printing and encoding a smart card 110. (An example user interface for such an application is shown in FIG. 4 and described in detail below.) The client device 202 also includes a printer driver 220 that processes the printing data 212 and the encoding data 214 to generate an integrated data stream 222. The integrated data stream 222 facilitates integrated printing and encoding of the smart card 110. In the example shown in FIG. 2A, the smart card production subsystem 208 includes separate modules for printing and encoding the smart card 110 (e.g., card printer 240 and card encoder 250, respectively). Therefore, a command coordinator 230 is used to extract, route, and synchronize printer commands 232 and encoder commands 234 obtained from the integrated data stream 222. Although the command coordinator 230 is shown as residing on the client device 202, this is not required. For example, the command coordinator can instead reside on a different device (e.g., a print server) that hosts a print queue. In a Windows print spooling architecture, the command coordinator can be implemented as a language monitor on a print server, which may be physically attached or otherwise connected to the printer.

Separation of the printer commands 232 and the encoder commands 234 facilitates sending the appropriate commands to the appropriate modules of the smart card production subsystem 208. In the example shown in FIG. 2A, the card printer 240 and the card encoder 250 may be included in the same physical device, or in different physical devices. In either case, the system 200 may recognize the card printer 240 and the card encoder 250 as separate devices and communicate with them separately. The separate communications are coordinated by command coordinator 230 to help ensure that the smart card 110 is printed and encoded properly. For example, in the context of printing and encoding a series of several employee identification cards, the command coordinator 230 can ensure that information to be encoded on the smart card 110 (e.g., private information such as a building access code) matches the employee identified in information to be printed on the smart card 110.

In the example shown in FIG. 2B, the card printer 240 prints on a surface of the smart card 110, and the card encoder 250 writes data to the smart card storage 112. As shown, the card encoder 250 also can read data from the smart card storage 112. For example, the card encoder 250 can read data after an encoding operation to confirm that the data has been encoded properly. As another example, the card encoder 250 can read data (e.g., a card ID) that was stored on the card (e.g., by the card manufacturer) prior to performing an encoding operation.

The command coordinator can log or send notifications about success or failure of printing and encoding operations. For example, the command coordinator can send a notification of success if the printing operation and encoding operation for the smart card 110 both succeed. The command coordinator can then take action (or send a notification to cause some other system component to take action) based on the success or failure of the printing and encoding actions. The integrated smart card printing and encoding system 200 or other systems described herein can take action based on success or failure of the printing encoding actions even where a printing device and an encoding device are enumerated as separate devices. This can help to avoid the need for a separate application to take action based on success or failure of operations if the printer and encoder are enumerated as separate devices.

Success or failure may be written to a log file or result in a user notification. If the smart card 110 is not printed or encoded properly, possible actions may include one or more of the following: Logging an error; moving a card to a "reject bin" (if the printer has one); modifying the card, such as by printing "void" on the card (to discourage use of the card); or retrying with another card.

In practice, information such as the printing data 212, the encoding data 214, the integrated data stream 222, the printer commands 232, and the encoder commands 234 can be formatted and handled in different ways depending on the needs and configuration of the system 200. Further, modules such as the printer driver 220 and the command coordinator 230 can be implemented in different ways depending on the needs and configuration of the system 200. For example, the application 210 can expose a device-independent printing interface (e.g., a graphics device interface (GDI)) with an escape function (e.g., ExtEscape) that can be used to pass printing data 212 and/or encoding data 214 to the printer driver 220, which can then assemble the integrated data stream 222. The command coordinator 230 can be implemented as a language monitor that parses the integrated data stream 222 and extracts printing commands and encoding commands, as described in further detail below. In a printer sharing context, print jobs can come from different client devices. In such a context, a command coordinator can reside on a print server (not shown), and can communicate with and synchronize commands from the different client devices. In one embodiment, the entire data stream for a single job corresponding to an item to be printed and encoded from one client device is processed in its entirety prior to processing another job corresponding to another item to be printed and encoded from a second client device. The command coordinator ensures that the commands from the two devices do not overlap or interfere with one another.

DETAILED EXAMPLES

This section describes detailed examples that can be used in the context of operating systems such as a Microsoft Windows operating system. In the context of a Microsoft Windows operating system, applications can use a graphics device interface (GDI) to draw objects and pass related information to a printer driver. The printer driver generates print code, which is recorded to a spool file. The spool file is loaded by a print spooler and sent to the printer. In a mode that can be referred to as "Windows driver mode," an application can print to a printer that has a Windows printer driver. A spooler component (USBMON) handles all I/O with USB printer devices, and it accesses only a single USB device. In this mode, it may not be possible to use some device features, such as RFID or smart card encoding, adding data to a magnetic stripe, or printing data to a UV fluorescing panel. In a mode that can be referred to as "native mode," an application can communicate directly with a printer independent of the Windows printer driver. Knowledge of the printer's command set is built into the application, thereby limiting such communication to specific supported devices. In order to support smart card encoding with a Windows printer driver, it would be necessary for the printer driver to communicate with both a USB printer device and a USB smart card encoding device as the spool file is being played back.

Accordingly, in one embodiment an escape command is used to send smart card encoding data to a printer driver. The printer driver embeds a packet containing encoding data in a print stream that is recognized by a language monitor to which smart card functionality has been added. The encoding data in the embedded packet is transformed into smart card encoder commands. This enables smart card encoding to take place at appropriate times in a print job that has been spooled, even when the print job involves multiple cards. A Windows print spooler can call the language monitor to print and encode smart cards. The language monitor is not limited to smart card printing and encoding tasks and may handle other tasks, as needed.

GDI provides application programming interfaces (APIs) that include functions related to spooler control (e.g., StartDoc, EndDoc, StartPage, EndPage), drawing bitmap images (e.g., BitBlt, StretchBlt, PatBlt, PlgBlt, MaskBlt), drawing vector images (e.g., BeginPath, EndPath, LineTo, ArcTo, PolyDraw), and drawing text using printer fonts (e.g., ExtTextOut, EnumFontFamilies, GetTextExtentPoint32). When printer drivers support features such as text or vector image drawing, the GDI will pass the calls from the application directly down to the driver. If the driver does not support a particular drawing feature, in most cases GDI will emulate the drawing feature and a bitmap image will be sent to the driver.

Some printers provide features that are not directly represented by functions in a GDI API. For example, many label printers have commands for drawing bar codes with a single command, but GDI does not provide an API for rendering bar codes. To handle such features, GDI provides a way to send data that is not explicitly defined by the GDI to a printer driver. The data that is not explicitly defined by the GDI can be used by an application to communicate with the driver so long as both the application and driver are written to understand the data format and its intended meaning. An escape command (e.g., ExtEscape) can be used to tell the printer driver to do something that is not directly represented by functions in the GDI API, such as render a bar code. An escape command can also be used for other tasks, such as returning data from the driver. In the bar code context, although it is possible to draw bars as graphical elements (e.g., using the PatBlt function), sending a large number of individual lines to be drawn is significantly less efficient than using a printer's built-in bar code command. The application can query a printer to determine if the escape command is supported, and if it is, the entire bar code can be rendered using the escape command instead of drawing the bars individually.

In addition to drawing bar codes, escape commands also can be used for accessing features such as smart card encoding, RFID encoding, magnetic stripe encoding, printer-based counters (serialization), graphics and format caching, and performance optimizations, and for obtaining information about a device. For example, the escape command UT_Escape_GetDriverInfo can be used to obtain information about the printer driver. As another example, UT_Escape_GetMediaProperties can be used to obtain information about the media (e.g., the smart card) that is loaded into the printer.

The escape commands Escape_Encode and Escape_Write can be used to encode RFID cards or smart cards. Escape_Encode is used to convert data to a hexadecimal format. Data is converted based on parameters provided in a related data structure (EncodingData). A character string with encoded data is output. Data to be converted immediately follows the EncodingData structure. Null-terminated narrow character data is expected. Escape_Encode is first called with a null output pointer and returns the required size. A character buffer is allocated passed into the escape command to obtain the encoded data. Escape_Encode is called before Escape_Write, which is called to write encoded data. Input to Escape_Write is a pointer to an EncodingData structure, which is immediately followed by encoded data. Null-terminated narrow character data is expected.

As an example, an application can call ExtEscape( ) with the following parameters:
hDC=device context of printer
nEscape=12004 (Escape_Write)
cbInput=sizeof(EncodingData)
lpszInData=address of an EncodingData structure
cbOutput=0
lpszOutData=NULL.

An example definition of the EncodingData structure is provided below:

```
#define TAG_FORMAT_SCHEME_SIZE 128
struct U EncodingData {
    WORD structSize; // Size of this structure
    WORD textDataSize; // Size of data following structure
    BOOL16 isFormatObj; // Optimization: use format mode?
    BOOL16 isSerializationObj;// Optimization: serialize Tag?
```

-continued

```
    INT32 serializeBy; // Optimization: serialization increment
    INT32 tagType; // MIFARE, ISO 7816, etc.
    INT16 encoding; // ASCII, HEX or Decimal
    BOOL16 lock; // Lock block after write?
    INT16 startingBlock; // Starting block for write
    INT16 segment; // Segment for write. Start block relative to
segment.
    INT32 formatID; // Raw 64, Raw 96, Custom, etc ...
    Char formatScheme[TAG_FORMAT_SCHEME_SIZE];
        // bit mask for tag data
}; // Data follows this structure (this + structSize); null terminated.
```

The EncodingData structure can be initialized as follows:
Allocate a block of memory that is sizeof(EncodingData) plus the size of the data to be encoded (including terminating null).
Initialize the first sizeof(EncodingData) bytes as an EncodingData structure:
Set structSize to sizeof(EncodingData);
Set textDataSize to length of encoded data (including terminating null);
Set tagType;
Set encoding to Encoding_HEX if data is supplied as hexadecimal, otherwise use Encoding_ASCII if the data is text;
Set formatID to TagFormat_Unformatted (0xFFFF);
Other values specific to certain tag types can be set at 0 to simply encode raw data to the tag.
Following the structure, copy the data to encode, including terminating null.
A typical sequence of encoding data can described as follows:
StartDoc;
StartPage;
draw text, graphics, and other objects;
DrvEscape(Escape_Write, . . . );
EndPage;
repeat StartPage to EndPage sequence, as desired;
EndDoc.

Although the escape command is shown after drawing operations such as text and graphics, the order is not necessarily relevant; the driver will handle the encoding at the time that is appropriate for the specific printer in use. However, to associate the encoding command with the correct item, the escape is called between StartPage and EndPage.

Although the above steps generally can be used to encode a smart card, when the smart card encoder is recognized as a separate USB device, there may be no printer command that can be sent to the printer device to actually cause the smart card to be encoded. For example, if a smart card encoder is not completely integrated with the printer (e.g., where if it is housed in the printer's case but the printer's firmware does not communicate directly with the encoder), Windows sees the encoder as a completely separate USB device.

The traditional architecture of Windows printer drivers does not easily accommodate separate communication with the devices that can be coordinated in an integrated smart card printing and encoding process. A print job can be spooled, and the application can start creating another print job, or even be completely shut down before the first job has completed printing.

In order to synchronize smart code encoding with the printing of a surface of a smart card (which can be referred to as a page in this context), in one embodiment the smart card encoding is performed by a language monitor at the time the print code is de-spooled and sent to the printer. In general, a language monitor associated with a printer takes data sent to the language monitor and sends it to the printer using a port monitor. It is also possible to communicate with the printer to check the status of the printer (e.g., before or after each page), which can be helpful for tasks such as informing users about printer errors. However, in examples described herein, when a smart card command is received from the printer driver, the language monitor communicates with the smart card encoder. Further communication with the printing module can be blocked until encoding is completed, in order to keep the encoding and printing of each smart card synchronized.

The ability of the print driver and the language monitor to work together in described examples allows certain kinds of middleware to be omitted. An application (e.g., a word processing application) can work directly with the printer driver and language monitor to print and encode smart cards in an integrated process, even where the printing module and the encoding module are recognized as separate devices.

An example schema (called XPML) for sending data from a printer driver to a language monitor is described below. In one embodiment, the schema is included in an integrated data stream by the printer driver, and the printer driver marks text using XPML. For example, the schema can be used to synchronize commands (e.g., printing commands and encoding commands) that relate to the same media (e.g., an individual smart card) to be printed and encoded. For example, commands can be included together in a logical page using a "page" tag, as shown below:

```
<xpml>
    (encoding commands)
    (printer commands)
<xpml></xpml>
```

In the example shown above, "quantity" can be used to encode identical copies (e.g., where smart card data is identical for all units to be encoded). Within the page, the order of the encoding commands relative to the printer commands is not important. The language monitor sends the commands in an appropriate order, which can be device-dependent.

Smart card commands can be formatted as follows:

```
<xpml><smart_card reader='name_of_card_reader' copies='3'></xpml>
    (smart card commands here)
<xpml></smart_card></xpml>
```

In the example shown above, the "smart_card" tag indicates a command. The XPML is embedded into the print stream by the driver, and will mark text between two tags (e.g., "smart_card" and "/smart_card") as being a smart card command. An example of data that can be included in a markup language packet (e.g., an XML packet) between the two tags and sent to the language monitor is shown below:

```
<?xml version="1.0" encoding="utf-8" ?>
- <smart_card type="mifare" size="16" pad="true">
    - <encode block_start="1">
        - <authenticate>
            <data_access key_index="A">FFFFFFFFFFFF</data_access>
            <security_access key_index="A">FFFFFFFFFFFF</security_access>
        </authenticate>
        <modify_key key_index="A">EEEEEEEEEEEE</modify_key>
        <modify_key key_index="B">CCCCCCCCCCCC</modify_key>
        - <modify_access_conditions>
            <data_access>4</data_access>
            <key_access>5</key_access>
        </modify_access_conditions>
        <data format="hex">00112233445566778899AABBCCDDEEFF
        </data>
    </encode>
    - <encode block_start="4">
        - <authenticate>
            <data_access key_index="A">FFFFFFFFFFFF</data_access>
            <security_access key_index="A">FFFFFFFFFFFF</security_access>
        </authenticate>
        <modify_key key_index="A">EEEEEEEEEEEE</modify_key>
        <modify_key key_index="B">CCCCCCCCCCCC</modify_key>
        - <modify_access_conditions>
            <data_access>4</data_access>
            <key_access>5</key_access>
        </modify_access_conditions>
        <data format="hex">121212121212121212121212121212</data>
    </encode>
</smart_card>
```

Figure 3:
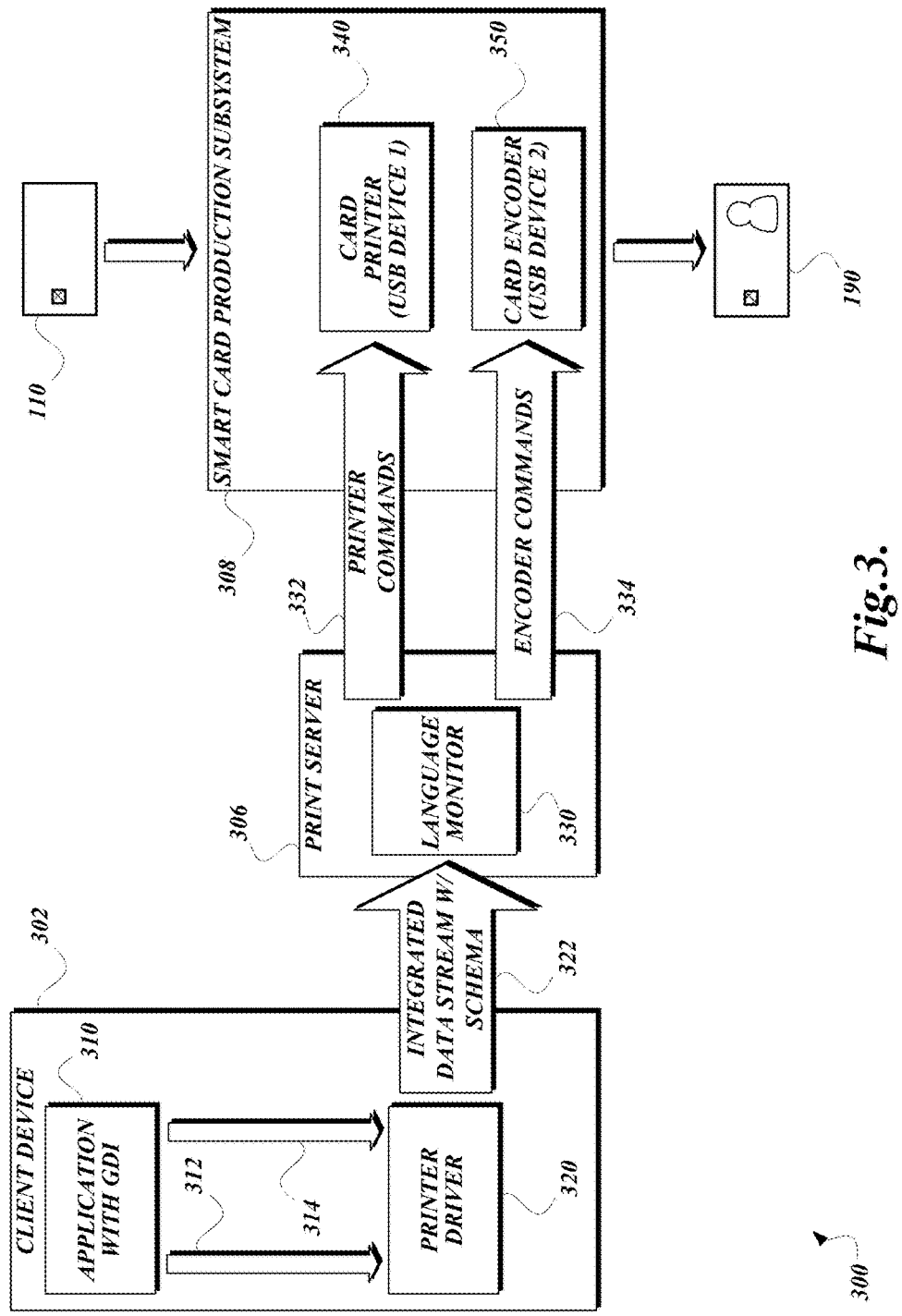
FIG. 3 is a block diagram that illustrates another detailed example of an integrated smart card printing and encoding system according to various aspects of the present disclosure.

FIG. 3 is a block diagram that illustrates another integrated smart card printing and encoding system 300 according to various aspects of the present disclosure. The system 300 includes a client device 302, a print server 306, and a smart card production subsystem 308 that communicate via a network.

In the example shown in FIG. 3, the client device 302 runs an application 310 having a device-independent printer interface (e.g., GDI) that can be used to provide data (e.g., printing data 312 and encoding data 314) for printing and encoding a smart card 110. The GDI provides application programming interfaces (APIs) to perform various operations (e.g., spooler control, drawing bitmap images, drawing vector images, drawing text), and also provides an API (e.g., ExtEscape) that can be used to be send data in alternative formats and perform device-specific operations when used with an appropriately configured printer driver (e.g., printer driver 320). The printer driver 320 processes the printing data 312 and the encoding data 314 to generate an integrated data stream 322. The integrated data stream 322 facilitates integrated printing and encoding of the smart card 110. The smart card production subsystem 308 includes separate modules for printing and encoding the smart card 110 (e.g., card printer 340 and card encoder 350, respectively). Therefore, a language monitor 330 residing on the print server 306 is used to route and synchronize printer commands 332 and encoder commands 334 obtained from the integrated data stream 322. The language monitor 330 can use bidirectional communication (e.g., by receiving status information from a device after routing printer commands 332 and encoder commands 334) to determine when the card printer 340 and the card encoder 350 are ready to move to the next printing or encoding step, respectively. In the example shown in FIG. 3, the integrated data stream 322 includes schema (e.g., XML schema) with tags that can be parsed by the language monitor 330 to extract encoder commands 334. The card printer 340 and the card encoder 350 may be included in the same physical device, or in different physical devices. In either case, the system 300 recognizes the card printer 340 and the card encoder 350 as separate USB devices, and the client device 308 communicates with them separately. The separate communications are coordinated by the language monitor 330 to ensure that the smart card 110 is printed and encoded properly.

In practice, information such as the printing data 312, the encoding data 314, the integrated data stream 322, the printer commands 332, and the encoder commands 334 can be formatted and handled in different ways depending on the needs and configuration of the system 300. Further, modules such as the printer driver 320 and the language monitor 330 can be implemented in different ways depending on the needs and configuration of the system 300. In a printer sharing context, printing and encoding jobs can come from different client devices. For example, a first client device can send a first unit of integrated data for printing and encoding a first smart card, and a second client device can send a second unit of integrated data for printing and encoding a second smart card. In such a context, the language monitor 330 can communicate with and synchronize commands from the different client devices.

FIG. 4 illustrates an example user interface 400 that may be presented to a user of a client device (e.g., client device 202 in FIG. 2A, client device 302 in FIG. 3) as part of or in combination with an integrated smart card printing and encoding process.

In the example shown in FIG. 4, the interface 400 includes a template 401 comprising a photo element 410 depicting a person identified in text elements 420. As shown, the interface 400 is used for printing and encoding smart cards that act as employee identification cards. In an integrated smart card printing and encoding process, any of the information shown in elements 410 and 420 (or other information) can be printed on a smart card, encoded in storage on a smart card, or both. As an example, some information in text elements 420 (e.g., First Name, Last Name, Employee ID) can be printed on a surface of a smart card along with the photo shown in photo element 410, while other information (e.g., Access Code, Email Address) can be encoded in storage on the smart card (e.g., to protect employee privacy or for security purposes). The interface 400 also includes a "print and encode card" button 430 (which can be used to initiate an integrated smart card printing and encoding process) and a "cancel" button 440. The interface 400 also includes a toolbar 450 comprising an encoding options button 460. The icon shown on the encoding options button 460 includes a depiction of a radio signal and a card with a magnetic strip and smart card storage. The icon shows that interface 400 provides several different encoding options, including RFID options, magnetic stripe options, and smart card encoding options. Dropdown box 470 includes a list of several encoding options, including RFID options (e.g., RFID standards such as EPC Gen 2/ISO 18000-6C and ISO 15693 (vicinity RFID)), magnetic stripe options (e.g., ISO 7811, JIS II), and smart card options including contact (e.g., ISO 7816) and non-contact (e.g., MIFARE, EPC Gen 2/ISO 18000-6C) options. Dropdown box 470 may include all the options shown, additional options, or fewer options. For example, the options shown may depend on conditions of an integrated smart code printing and encoding system (e.g., showing only options that are compatible with the particular system, while hiding other options) or on other factors, such as user preferences.

Many alternatives to the interface 400 are possible. For example, the elements shown in FIG. 4 may be supplemented or replaced by any number of other elements exhibiting the same functionality or different functionality. As another example, the elements shown in FIG. 4 or other elements can be presented at the same time on the same screen or at different times and/or on different screens. As another example, information obtained by user input via the interface 400 may instead be obtained in some other way (e.g., from a database or other data source). The interface 400 shown in FIG. 4 may be provided in a browser (not shown), in a standalone application executing on a client device, in a server application executing in a cloud computing environment, or in some other way. In any of the described examples, user interface elements can be actuated by keyboard input, mouse input, touchscreen input, voice input, or any other suitable user input event.

Example Techniques

Figure 5:
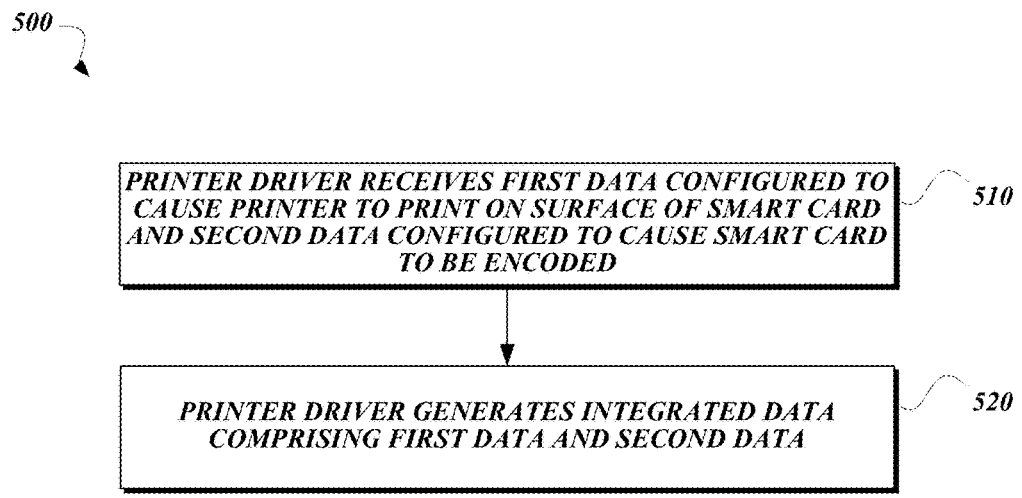
FIGS. 5, 6, and 7 are flow charts that illustrate example techniques according to various aspects of the present disclosure.
Figure 6:
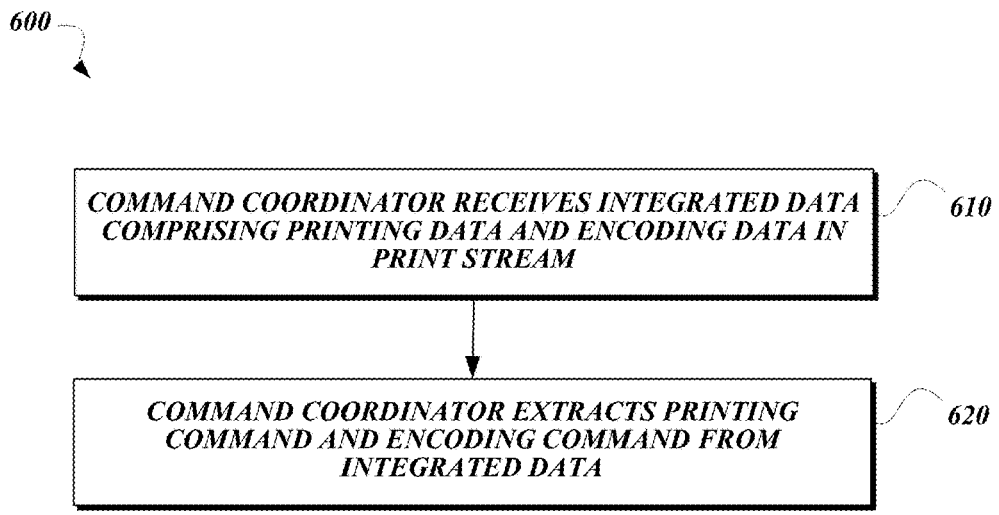
Figure 7:
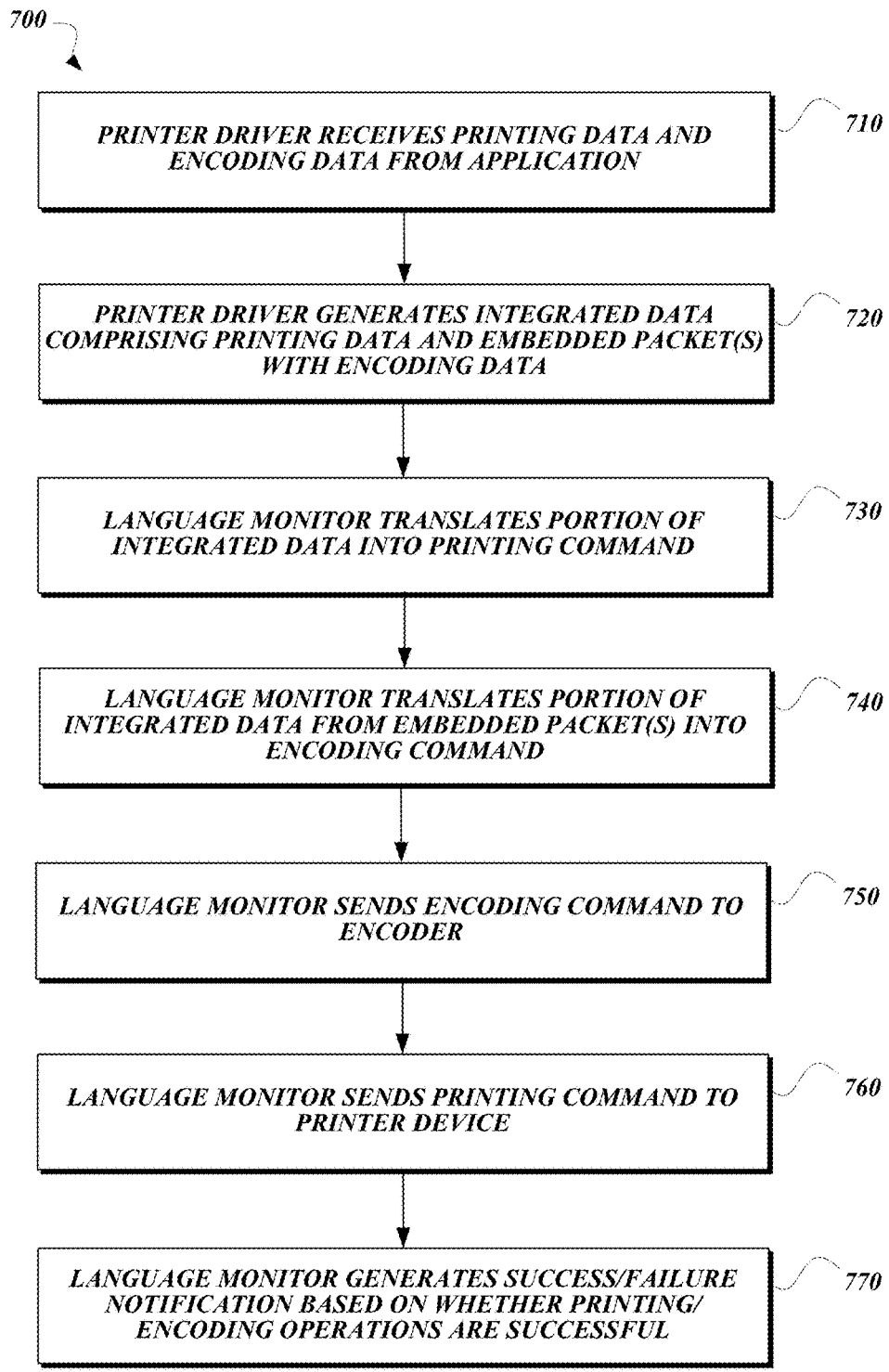

FIGS. 5 through 7 illustrate example techniques 500, 600, 700 that may be used as part of an integrated smart card printing and encoding process. The illustrated techniques can be performed by a client device such as client device 202 (FIG. 2A), client device 302 (FIG. 3), or by some other device or combination of devices.

In the generalized technique 500 shown in FIG. 5, at 510 a printer driver receives a first set of data configured to cause a printer to print on a surface of a smart card along with a second set of data configured to cause the smart card to be encoded. At 520, the printer driver generates integrated data comprising the first set of data and the second set of data.

In the generalized technique 600 shown in FIG. 6, at 610 a command coordinator (e.g., a language monitor) receives (e.g., from a printer driver that performs the technique 500 shown in FIG. 5) integrated data in a print stream. The integrated data comprises printing data and encoding data (e.g., smart card encoding data). At 620, the command coordinator extracts a printing command and an encoding command from the integrated data.

In the detailed technique 700 shown in FIG. 7, at 710 a printer driver receives printing data and encoding data from an application. For example, the application may expose a device-independent printing interface (e.g., GDI) with specifically defined functions for sending some kinds of data and one or more escape functions for sending other kinds of data (e.g., encoding data or printing data that is not directly supported by the device-independent printing interface). At 720, the printer driver generates integrated data comprising the printing data and one or more embedded packets (e.g., a markup language packet such as an XML packet) that include the encoding data. At 730, a language monitor translates a first portion of the integrated data into a printing command. At 740, the language monitor translates a second portion of the integrated data from the embedded packet into an encoding command (e.g., a smart card encoding command). At 750, the language monitor sends the encoding command to an encoder (e.g., a smart card encoder). At 760, the language monitor sends the printing command to a printer device. The order in which the encoding command is sent relative to the printing command can vary depending on implementation. Once the commands have been sent, the language monitor can take action (e.g., by sending appropriate notifications) if the corresponding printing and encoding operations succeed or fail. At 770, the language monitor generates a success or failure notification, as appropriate, based on whether the printing and encoding operations were successful. For example, the language monitor can generate a success notification if both the printing and the encoding operations are successful, and can generate a failure notification if either the printing operation or the encoding operation is not successful.

The encoder can be recognized as a device that is separate from the printer device. For example, the encoder and the printer device can be enumerated as separate USB devices, even where the encoder and the printer device are housed in the same physical device. If multiple items (e.g., smart cards) are being encoded and printed, the language monitor can coordinate commands such that printing and encoding commands for each item are synchronized. For example, if a smart card has been printed and is in the process of being encoded, further commands (e.g., print commands or encoding commands for additional smart cards) can be blocked until the encoding process for the smart card is complete.

Many alternatives to the illustrated techniques are possible. For example, processing stages illustrated in the various techniques can be separated into additional stages or combined into fewer stages. As another example, processing stages illustrated in the various techniques can be omitted or supplemented with other techniques or processing stages. As another example, processing stages illustrated as occurring in a particular order can instead occur in a different order. As another example, processing stages that are illustrated as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Operating Environment

In any of the examples described herein, client devices may be any suitable computing devices, including, but not limited to, laptop computers, desktop computers, smart phones, tablet computers, and/or the like. Servers may include suitable computing devices configured to provide services described in further detail below. As used herein in the context of a server-client relationship, the term "server" refers generally to a computing device that provides information and/or services to other devices over a communication link (e.g., a network connection), and is not limited to any particular device configuration. Servers may include one or more suitable devices, such as dedicated server computing devices, or virtualized computing instances or application objects executing on a computing device. The term "client" can be used to refer to a computing device (e.g., client devices 102A-N (FIG. 1)) that obtains information and/or accesses services provided by a server over a communication link, and is not limited to any particular device configuration. The designation of a particular device (e.g., client device 202 (FIG. 2A)) as a client device does not necessarily imply or require the presence of a server. At various times, a single device may act as a server, a client, a server and a client, or neither, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 8:
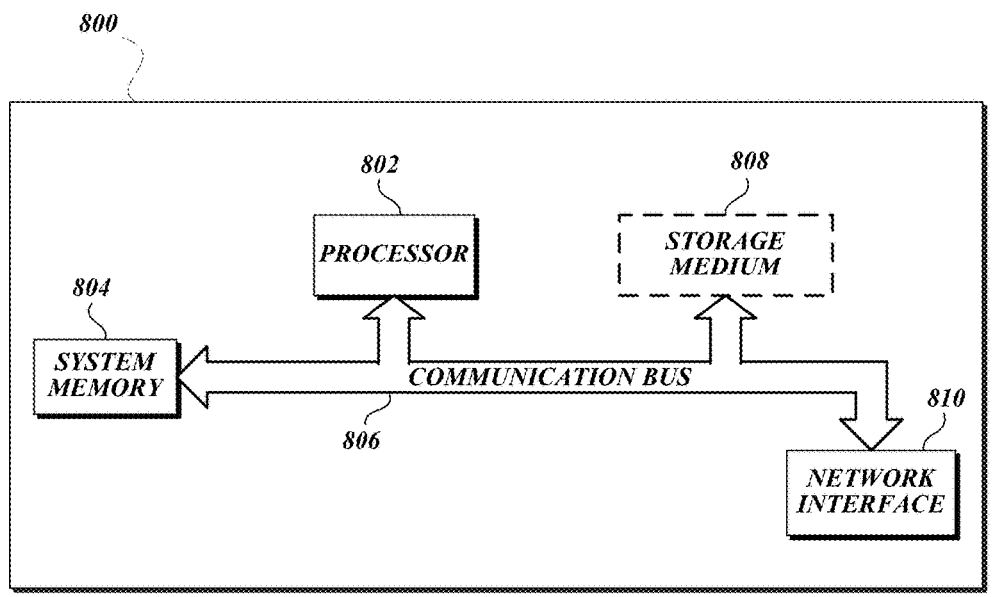
FIG. 8 is a block diagram that illustrates aspects of an exemplary hardware architecture of a computing device suitable for use with embodiments of the present disclosure.

FIG. 8 is a block diagram that illustrates aspects of an exemplary computing device 800 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or other memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are examples of computer-readable media.

For ease of illustration and because it is not important for an understanding of the claimed subject matter, FIG. 8 does not show some of the typical components of many computing devices. In this regard, the computing device 800 may include input devices, such as a keyboard, keypad, mouse, trackball, microphone, touchpad, touchscreen, stylus, and/or the like. Such input devices may be coupled to the computing device 800 by wired or wireless connections including RF, infrared, serial, parallel, Bluetooth, USB, or other suitable connection protocols using wireless or physical connections. The computing device 800 may also include output devices such as a display, speakers, printer, etc.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a storage medium) or computer storage device and be stored on and executed by one or more general-purpose or special-purpose processors, thus creating a special-purpose computing device configured to provide functionality described herein.

Extensions and Alternatives

Many alternatives to the described systems and techniques are possible. For example, although only a single client device is shown in FIGS. 1-3 for ease of illustration, the described systems can comprise multiple client devices, which can interact with the system one at a time or simultaneously. For example, it is possible for a first printing and encoding job (e.g., corresponding to a first smart card) to come from a first client device and second printing and encoding job (e.g., corresponding to a second smart card) to come from a second client device. Jobs from different client devices can be synchronized (e.g., by a language monitor on a print server), and printing and encoding commands can be performed in the order in which they are queued.

Further, although various examples described herein are directed to communication with USB devices, such examples can be modified for communication with devices through interfaces or protocols other than USB (e.g., Bluetooth, TCP/IP).

Still further, although certain techniques such as GDI escape commands and embedded XML commands are described for encoding smart cards, other techniques also can be used, such as using device fonts to send text to a printer driver that can then be used to encode a smart card.

Still further, although various examples described herein are directed to printing and encoding smart cards, the examples can be adapted to print and encode other media. For example, described examples can be adapted for media types other than cards (e.g., optical disks or any other media that can be printed and encoded) which support RFID or RFID-like technologies.

Still further, various examples herein can be adapted to coordinate printing and encoding commands for duplex printers, which can print on both sides of a print medium, such as a smart card, label, or other printable media. For example, a command coordinator can extract a smart card encoder command, a first printer command for a front surface of a smart card, and a second printer command for a back surface of the smart card from a unit of integrated data that corresponds to the smart card to be printed and encoded.

Still further, encoding may involve reading data from the item to be encoded, as well as writing data. For example, it is possible for data to already be present on a smart card when smart card encoding begins. Some smart cards may have a unique ID stored on them (e.g., by a manufacturer). This unique ID can be read and one or more actions (e.g., storing the unique ID in a database) can be taken (e.g., by a command coordinator), separately or as part of an encoding process. As another example, data that has been written to the card during an encoding operation can be read back from the card for verification purposes. While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A computer-implemented method comprising:
   by a printer driver residing on a computing device that is separate from a printing device, receiving first data configured to cause the printing device to print on a surface of a smart card and second data configured to cause a smart card encoder to encode the smart card with computer-readable data;
   by the printer driver residing on the computing device that is separate from the printing device, generating an integrated data stream comprising the first data and the second data; and
   by a command coordinator, extracting a printer command and a smart card encoder command from the integrated data stream.

2. The method of claim 1, wherein the printer command and the smart card encoder command correspond to a first client device in a network environment comprising plural client devices that share the printing device and the smart card encoder.

3. The method of claim 1, wherein the command coordinator comprises a language monitor.

4. The method of claim 1, further comprising:
   by the command coordinator, sending the smart card encoder command to the smart card encoder; and
   by the command coordinator, sending the printer command to the printing device.

5. The method of claim 4, wherein the smart card encoder and the printing device are included in the same physical device.

6. The method of claim 1, further comprising, by the command coordinator, reading stored data from the smart card.

7. The method of claim 6, wherein the stored data comprises a card identifier.

8. The method of claim 1, further comprising:
by the command coordinator, sending the smart card encoder command to the smart card encoder; and
reading encoded data from the smart card to verify an encoding operation corresponding to the smart card encoder command.

9. The method of claim 1, wherein the printer command and the smart card encoder command are associated with the computing device that is separate from the printing device, the method further comprising:
by the command coordinator, extracting one or more additional commands from the integrated data stream, wherein the one or more additional commands are associated with one or more other client devices.

10. The method of claim 1, wherein the printing device is a duplex printer configured to print on plural surfaces of the smart card.

11. The method of claim 10, further comprising, by the command coordinator, extracting a printer command for each of the plural surfaces from the integrated data stream.

12. One or more non-transitory computer-readable storage media having stored thereon computer-executable instructions configured to cause a computer system to perform the following steps:
by a printer driver residing on a computing device that is separate from a printing device, receive first data configured to cause the printing device to print on a surface of a smart card and second data configured to cause a smart card encoder to encode the smart card with computer-readable data;
by the printer driver residing on the computing device that is separate from the printing device, generate an integrated data stream comprising the first data and the second data; and
by a command coordinator, extract a printer command and a smart card encoder command from the integrated data stream.

13. A computing device comprising a processor and computer-readable storage media having stored thereon computer-executable instructions configured to:
cause a printer driver on a client device to receive printing data and encoding data from an application; and
cause the printer driver on the client device to generate an integrated data stream comprising the printing data and the encoding data, wherein the printing data is configured for translation into one or more printing commands, and wherein the encoding data is configured for translation into one or more encoding commands.

14. The computing device of claim 13, wherein the encoding data is included in an embedded packet in the integrated data stream, and wherein the embedded packet comprises a markup language packet.

15. The computing device of claim 13, wherein the computer-executable instructions are further configured to cause software on a print server to:
translate a first portion of the integrated data stream into a first printing command;
translate a second portion of the integrated data stream into a first encoding command;
send the first printing command to a printer device; and
send the first encoding command to an encoder.

16. The computing device of claim 15, wherein the encoder is enumerated as a USB device separate from the printer device.

17. The computing device of claim 15, wherein further commands are blocked until the first encoding command and the first printing command have been successfully performed.

18. The computing device of claim 15, wherein the computer-executable instructions are further configured to cause the software on the print server to:
translate a third portion of the integrated data stream into a second printing command;
translate a fourth portion of the integrated data stream into a second encoding command;
synchronize the first printing command with the first encoding command; and
synchronize the second printing command with the second encoding command.

19. The computing device of claim 18, wherein the first printing command and the first encoding command are directed to printing and encoding a first smart card in a series of plural smart cards, and wherein the second printing command and the second encoding command are directed to printing and encoding a second smart card in the series of plural smart cards.

20. The computing device of claim 13, wherein the application communicates with the printer driver via a device-independent printing interface.

21. The computing device of claim 20, wherein the device-independent printing interface includes an escape function configured to send at least the encoding data to the printer driver.

22. The computing device of claim 13, wherein the printer driver on the client device is configured to separately communicate with an encoder and a printer device in a synchronized manner.

23. The computing device of claim 22, wherein the encoder and the printer device are separate USB devices.

24. The computing device of claim 13, wherein the computer-executable instructions are further configured to:
send a printing command to a printer device;
send an encoding command to an encoder; and
generate a success notification or a failure notification based on whether printing and encoding operations corresponding to the encoding command and the printing command, respectively, have been successfully performed on a smart card.

25. The computing device of claim 24, wherein the computer-executable instructions are further configured to cause the printer device to modify the smart card if a failure notification is generated.

* * * * *